Nov. 5, 1940.  H. W. HACK  2,220,100
MEANS FOR INDICATING FAILURES IN AN AUTOMOTIVE LIGHTING SYSTEM
Filed June 8, 1938
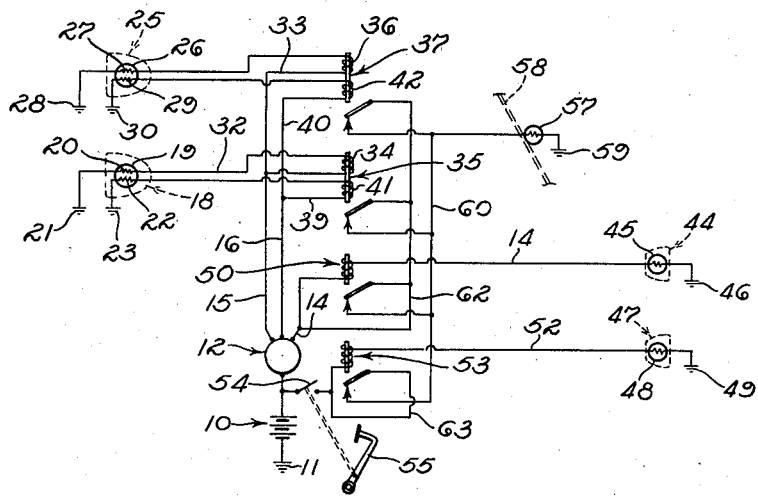
INVENTOR
HARRY W. HACK
HARRIS, KIECH, FOSTER & HARRIS
FOR THE FIRM
ATTORNEYS.

Patented Nov. 5, 1940

2,220,100

UNITED STATES PATENT OFFICE 2,220,100

MEANS FOR INDICATING FAILURES IN AN AUTOMOTIVE LIGHTING SYSTEM

Harry W. Hack, Los Angeles, Calif.

Application June 8, 1938, Serial No. 212,489

2 Claims. (Cl. 177—311)

My invention relates to indicating devices, with special reference to electric circuits, and is directed primarily to automatic means for indicating failure of lamps or lamp circuits in an automotive lighting system.

Driving without operative lights is a common cause of serious traffic accidents. Headlights give advance warning of cars approaching blind corners and two headlights must be burning to indicate to oncoming motorists the exact position of a car on a road. Even the most careful driver, however, may continue to drive at night for a considerable period of time after one or both of his headlights fail, unaware of his danger, especially in well lighted districts or in crowded traffic. A defective tail-light constitutes a hazard and is the cause of many rear end collisions, and since the tail-light is out of the normal field of the driver's range of vision, he may operate a car indefinitely without being aware of such defect. Failure of the stoplight is a grave traffic menace because many motorists habitually follow fast moving cars at close range, relying upon the stoplight of the leading car to give prompt warning of any abrupt deceleration.

The general object of my invention is to provide in combination with an automotive lighting system automatic means to indicate failure of lamps or lamp circuits in the system. More specifically, it is my purpose to provide indicating lamps or other indicating means within the normal range of vision of the driver adapted to be energized in response to failures in the lighting system.

In the preferred embodiment of my conception, an important object and feature of my invention is the provision of means whereby when one light of an automotive lighting system fails, another light in the system automatically adds to its own function the function of the disabled light. More specifically expressed, I propose to have a stoplight serve the function of a tail-light when the tail-light fails, or vice versa, to have the tail-light serve the function of the stoplight when the stoplight is out of order.

In the preferred form of my invention, a single indicator is employed to respond to failure of any one of a number of lights in the automotive system.

The above and other objects and advantages of my invention will be apparent from the description to follow, taken with the accompanying drawing.

In the drawing:

The figure is a wiring diagram of the preferred form of my invention;

In the figure, representing the preferred form of my invention, an automobile battery 10 has one terminal connected to a ground 11 and the other terminal connected in the usual manner to the usual lighting switch conventionally shown at 12. Such a lighting switch has at least two "on" positions, one position at which it energizes a tail-light wire 14 and a headlight wire 15 for burning the headlights brightly, and a second position at which it energizes the tail-light wire 14 and a headlight wire 16 for burning the headlights dimly.

The left headlight 18 is shown with a lamp 19 having a "bright" filament 20 grounded at 21 and a "dim" filament 22 grounded at 23. In like manner, the right headlight 25 houses a lamp 26 having a bright filament 27 grounded at 28 and a dim filament 29 grounded at 30.

The wire 15 from the switch 12 has a branch 32 to the bright filament 20 of the left headlight and a branch 33 to the bright filament 27 of the right headlight, the first branch including a winding 34 of a relay generally designated 35, and the second branch including a winding 36 of a relay generally designated 37. In like manner, the wire 16 for burning the headlights dimly has a branch 39 to the dim filament 22 of the left headlight and a second branch 40 to the low filament 29 of the right headlight, the branch 39 including a winding 41 of the relay 35 and the branch 40 including a winding 42 of the relay 37.

The tail-light of the automotive vehicle is shown at 44 as having a lamp 45 grounded at 46, and the stoplight is shown at 47 as having a lamp 48 grounded at 49, but it will be readily understood by those skilled in the art that the tail-light and stoplight may be combined in one fixture by providing a double filament lamp of the construction shown in the headlights. The tail-light is energized by the tail-light wire 14 through the winding of a relay 50. The stoplight 47 is energized by the battery through a wire 52 that includes the winding of a relay 53 and is broken by a switch 54, the switch being controlled in a well known manner by the brake pedal 55 of the vehicle so that the circuit through the stoplight is closed when the brakes of the vehicle are applied.

The indicator for apprizing the driver of failures in the lighting system may comprise a lamp 57 on the dashboard 58, the lamp being grounded at 59, such lamp being, by preference, red to signify danger. Each of the relay 35, 37, 50, and 53 has two separable contacts, as indicated in the drawing, the contacts being adapted to open when the corresponding relays are energized and to close when the corresponding relays are de-energized. One of the two contacts of each relay is connected with the indicator lamp 57 through a wire 60 and the other of each of the two contacts of the relays is arranged in some manner for electrical connection with the battery 10. I may, as shown in the drawing, connect the second contact of relays 35, 37, and 50 to the tail-light wire 14 by means of a wire 62, the connection being made between the switch 12 and the winding of the relay 50, the advantage of this arrangement being that normally the wire 62 will be de-energized when the light switch 12 is in the "off" position. The second contact of the fourth relay 53 is connected by a wire 63 with the wire 52, the connection being made between the winding of the relay 53 and the switch 54.

The operation of the system may be readily understood from the foregoing description. When the switch 12 is at either of its "on" positions, energizing the two headlights and the tail-light, current energizing the tail-light holds open the contacts of the relay 50 and current energizing the two headlights holds open the contacts of the relays 35 and 37, so that as long as the headlights and tail-light are in good order, none of the three relays will operate to energize the indicator lamp 57. Every time the stoplight 47 is energized by the driver depressing the brake pedal 55, the relay 53 is simultaneously energized to separate its contacts and prevent energization of the indicator lamp 57. If one of the headlight filaments fails, however, the corresponding relay 35 or 37 will be de-energized to permit the corresponding relay contacts to close, thereby energizing the indicator lamp 57. In the same manner, failure of the tail-light will de-energize the relay 50 and cause the indicator lamp to light. It is apparent, then, that if the tail-light or either of the headlights fails, the indicator light 57 will burn continuously as long as the switch 12 is at an "on" position, and it is further apparent that a failure will be indicated regardless of whether the failure is in a lamp itself or in the circuit that energizes the lamp. If the filament of the stoplight burns out or if the wire 52 leading to the stoplight is severed, the relay 53 will not be energized when the switch 54 is closed by actuation of the brake pedal 55, and, as a result, the contacts of the relay 53 will remain closed to cause the indicator lamp 57 to be energized during the period that the brake pedal is depressed.

It is to be noted that if, while the main switch 12 is closed, one of the headlights or the tail-light fails and causes the indicator lamp 57 to be energized, a circuit will be completed to the stoplight through the wire 60, the contacts of the relay 53, the wire 63, and the wire 52, and since the relay 53 will be in series with its own contacts, the relay 53 will alternately make and break its own circuit to cause the stoplight to flicker when the brake control switch 54 is open. The stoplight will, of course, burn steadily during those periods that the switch 54 is closed by the brake pedal. This abnormal behavior is not disadvantageous, however, but on the contrary, is a feature of my invention, since the flickering of the stoplight serves the purpose of the disabled tail-light. It is to be noted that although the stoplight serves two functions, those functions are adequately distinct, since the flickering changes to steady illumination as a warning when the driver applies the brakes of the vehicle.

The stoplight on a car serves as a warning signal for motorists following the car in daytime as well as at night, and it will be noted that if the stoplight fails either in the daytime or at night, the indicator lamp 57 will be illuminated each time the brake pedal is applied. An important feature of my invention is that in such a case of stoplight failure in daytime, the tail-light of the car automatically takes on the function of the stoplight.

This automatic transference of function may be understood by referring to the diagram. When the lighting switch 12 is at its "off" position in the daytime, none of the three relays 35, 37, and 50 is energized so that the corresponding relay contacts are closed. The wire 62 is cut off from the battery by the switch 12. As for the brake-operated switch 54, closing of this switch 54 normally results in separating the contacts of the relay 53. If, however, the stoplight fails, either because the lamp 48 burns out or because there is a break in the wire 52, the winding of the relay 53 will not be energized when the switch 54 is closed. In that case, the closing of the switch 54 by operation of the brake pedal will transmit current to the tail-light through the wire 63, the contacts of the relay 53, the wire 60, the contacts of relays 35 and 37 which are in parallel, the wire 62, and the tail-light wire 14.

I have described a preferred form of my invention in specific detail for the purpose of disclosure and to illustrate the principles involved. My description will suggest to those skilled in the art various changes and modifications that do not depart from the essence of my conception, and I reserve the right to all such changes and modifications that properly come within the scope of my appended claims.

I claim as my invention:

1. An automotive lighting system, having: a stoplight circuit including a stoplight, a stoplight switch, and a conductor therebetween; a tail-light circuit including a tail-light and a tail-light conductor; a headlight circuit including a headlight and a headlight conductor; a lighting switch connected to said tail-light conductor and said headlight conductor for controlling said tail-light and headlight circuits; a relay coil in each of the respective stop light and head light conductors, a stationary contact spaced from each of said relay coils, an armature pivotally mounted between each coil and its spaced contact, said coils and associated parts comprising relays arranged in series connection with the stop light and tail light conductors, both of said relays being adapted to take continuously closed positions, one of said relays being adapted to open in response to energization of said stoplight circuit, the other relay being adapted to open in response to energization of said headlight circuit, whereby both of said relays will take continuously closed positions when said lighting switch is open and said stoplight circuit fails and in such situation closing of the stoplight switch will energize said tail-light in a continuous manner.

2. An automotive lighting system, having a stop-light circuit including a stoplight, a stoplight switch, and a conductor therebetween; a tail-light circuit including a tail-light and a tail-light conductor; a headlight circuit including a headlight and a headlight conductor; a lighting switch connected to said tail-light conductor and said headlight conductor for controlling said tail-light and headlight circuits, a relay coil in each of the respective stop and head light conductors, a stationary contact spaced from each of said relay coils, an armature pivotally mounted between each coil and its spaced contact, a conductor interconnecting the spaced contacts, said coils and associated parts comprising relays arranged in series connection with the stop light and tail-light conductors, both of said relays being adapted to take continuously closed positions, one of said relays being adapted to open in response to energization of said stoplight circuit, the other relay being adapted to open in response to energization of said headlight circuit, whereby both of said relays will take continuously closed positions when said lighting switch is open and said stoplight circuit fails and in such situation closing of the stoplight switch will energize said tail-light in a continuous manner, and an indicator in circuit with the interconnecting conductor between the relay contacts.

HARRY W. HACK.